Dec. 8, 1925. Re. 16,221
C. J. GEISER
SHOE SHINING STAND
Original Filed July 26, 1921
Fig. 1.
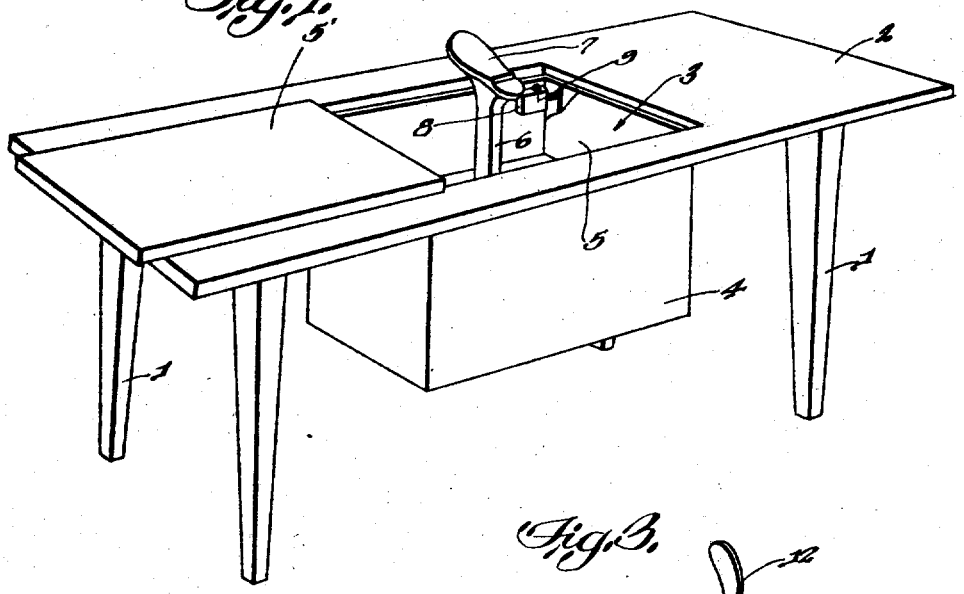
Fig. 3.
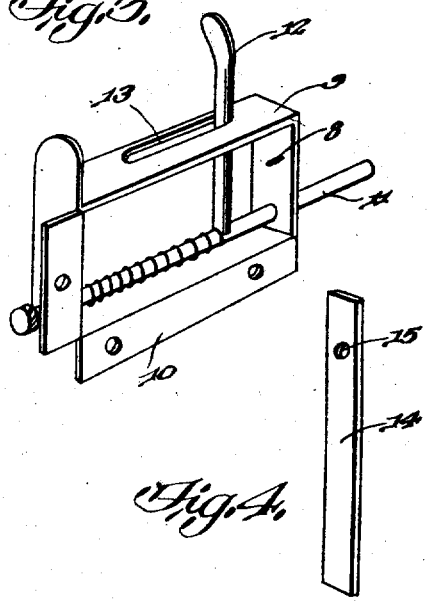
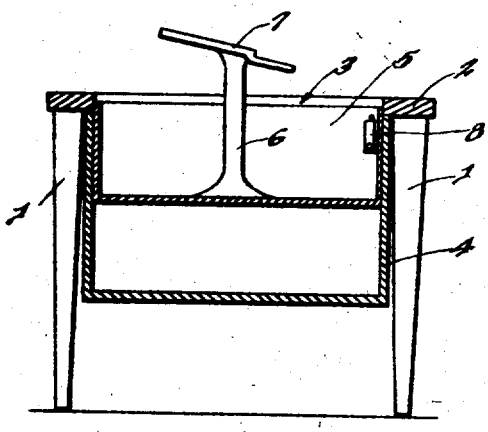
Fig. 2.
Fig. 4.
Charles J. Geiser
INVENTOR
BY Victor J. Evans
ATTORNEY
WITNESS:

Reissued Dec. 8, 1925. Re. 16,221

UNITED STATES PATENT OFFICE.

CHARLES J. GEISER, OF CHICAGO, ILLINOIS.

SHOE-SHINING STAND.

Original No. 1,486,240, dated March 11, 1924, Serial No. 487,703, filed July 26, 1921. Application for reissue filed October 20, 1925. Serial No. 63,771.

*To all whom it may concern:*

Be it known that I, CHARLES J. GEISER, a citizen of the United States, residing at Chicago, in the county of Cook and State of Illinois, have invented certain new and useful Improvements in Shoe-Shining Stands, of which the following is a specification.

This invention relates to improvements in shoe shining stands especially adapted for use in private homes, apartments and hotels.

The primary object of the invention is to provide a neat and ornamental stand which may be employed as a table or bench when the shoe shining apparatus is not in use.

Another object is to provide a stand which will include an adjustable foot rest which may be moved into operative position when the shoes are to be shined and which may be entirely hidden from view when the apparatus is not in use.

The invention further aims to provide a novel arrangement of parts whereby the apparatus may be locked in operative position and easily moved into inoperative position.

Other objects of the invention will appear upon consideration of the following detail description and accompanying drawings wherein:—

Figure 1 is a perspective view of the apparatus showing the top cover opened and the shoe shining stand exposed in operative position.

Figure 2 is a transverse section through the same.

Figure 3 is a perspective view of the locking apparatus, and

Figure 4 is a detail view of the member with which the locking apparatus engages.

Referring to the drawings by numerals, the stand consists of the legs 1 and the top 2 which is substantially rectangular in formation and is provided with a central opening 3. From the bottom of the top member 2, a housing 4 is suspended which consists of a box like structure of any desired size having its upper marginal edge fixed to the table top around the marginal edge of the opening 3. The opening 3 is normally closed by a hinged cover 5′ which is adapted to fit in the opening so that the top of the table or bench will have a neat and uninterrupted surface whereby the top may be employed to support suit cases or other articles.

Mounted for vertical sliding movement within the housing 4 is a receptacle 5 which is relatively shallow as shown in Fig. 2 and contains the pedestal 6 upon which the foot rest 7 is mounted. This receptacle 5 is vertically adjustable within the housing 4 so that the foot rest 7 may be raised or lowered above or below the opening 3 in the table top.

Mounted upon one wall of the receptacle 5 is a locking device 8 shown in detail in Fig. 3 which consists of the lock casing 9 having flanges 10 whereby fastening members may be employed to secure the lock casing to the wall of the receptacle 5. Mounted for longitudinal sliding movement in the lock casing 9 is a locking bolt 11 provided with an operating finger 12 which projects through a longitudinal slot 13 in the lock casing. The locking bolt 11 is provided with a coil spring on the interior of the lock casing whereby the end of the locking bolt is normally urged to operative position. The wall of the receptacle 4 is in the path of movement of the locking bolt 11 and is provided wih a longitudinal strip 14 having an opening 15 to receive the end of the locking bolt 11 when the receptacle 5 is elevated to its uppermost position so that the locking bolt 11 will automatically spring into the opening 15 and thus maintain the receptacle 5 in an elevated position as shown in Fig. 2 whereby the foot rest 7 will be exposed to permit the user to place his shoe upon the foot rest for shining and polishing his shoes.

The receptacle 5 naturally may be employed to contain the material necessary for cleaning the shoes. The receptacle 5 fits snugly within the housing 4 so that when the locking bolt 11 is released by the operation of the finger member 12, the receptacle 5 will not suddenly drop and strike against the bottom of the housing 4 but, by virtue of the air compression between the bottom of the receptacle will gradually drop into position without any jar or noise occurring.

Minor changes may be made in the details of construction without departing from the spirit of the invention or the scope of the claims hereunto appended.

What I claim is:—

1. An apparatus of the character described, comprising a table having an opening in its top, a cover normally closing the said opening and adapted to swing to open position, a housing attached to the top of the table around and beneath the said opening, a sliding receptacle within the said housing, a foot rest mounted within the receptacle and adapted to project upwardly through the opening in the table top when the receptacle is elevated, and means to maintain the receptacle in elevated position.

2. An apparatus of the character described comprising a table having its top provided with an opening, a receptacle, a housing attached to the table top and adapted to receive the said receptacle whereby the latter may be vertically raised and lowered within the housing, a foot rest, a pedestal supporting the foot rest and attached within the said receptacle, a locking bar, and a locking rod mounted in a locking casing and adapted to engage the locking bar whereby the said receptacle may be held in a raised position within the housing.

3. In an apparatus of the character described, a table provided with an opening in its top, a cover normally closing the said opening and adapted to swing to open position, a housing suspended from the table top beneath the said opening, a receptacle mounted for vertical movement within the housing and equipped with a foot rest supported within the receptacle, a locking bar attached to one side of the said housing, a lock casing mounted in the receptacle and including a spring pressed locking bolt adapted to engage the locking bar to support the receptacle when the latter is raised within the housing, and means to manually operate the said locking bolt to release the locking bolt from the said locking bar.

4. In an apparatus of the character described, a housing, a receptacle mounted in the housing for vertical movement therein and fitting snugly the interior of the housing, a foot rest carried by the receptacle and extending upwardly therefrom, and means for releasably securing the receptacle in raised position within the housing.

In testimony whereof, I have affixed my signature.

CHARLES J. GEISER.